US010852984B2

(12) United States Patent
Long et al.

(10) Patent No.: US 10,852,984 B2
(45) Date of Patent: Dec. 1, 2020

(54) MIRROR VOTE SYNCHRONIZATION

(71) Applicant: NetApp Inc., Sunnyvale, CA (US)

(72) Inventors: Brandon Taylor Long, Raleigh, NC (US); Linda Ann Riedle, Cary, NC (US); Manali Kulkarni, Bangalore (IN); Sandeep T. Nirmale, Santa Clara, CA (US); Vikram Harakere Krishnamurthy, Santa Clara, CA (US)

(73) Assignee: NetApp Inc., Sunnyvale, CA (US)

( * ) Notice: Subject to any disclaimer, the term of this patent is extended or adjusted under 35 U.S.C. 154(b) by 175 days.

(21) Appl. No.: 16/239,614

(22) Filed: Jan. 4, 2019

(65) Prior Publication Data

US 2019/0138216 A1 May 9, 2019

Related U.S. Application Data

(63) Continuation of application No. 15/165,006, filed on May 26, 2016, now Pat. No. 10,216,450, which is a (Continued)

(30) Foreign Application Priority Data

Mar. 20, 2014 (IN) ............................ 1498/CHE/2014

(51) Int. Cl.
*G06F 11/00* (2006.01)
*G06F 3/06* (2006.01)
(Continued)

(52) U.S. Cl.
CPC .............. *G06F 3/065* (2013.01); *G06F 3/067* (2013.01); *G06F 3/0619* (2013.01); *G06F 11/2069* (2013.01); *G06F 11/2094* (2013.01); *H04L 67/1095* (2013.01); *H04L 67/1097* (2013.01); *H04L 69/40* (2013.01); *G06F 11/2071* (2013.01); *G06F 11/2082* (2013.01)

(58) Field of Classification Search
CPC ............. G06F 11/2069; G06F 11/2056; G06F 11/2082; G06F 11/2064; G06F 11/0727
See application file for complete search history.

(56) References Cited

U.S. PATENT DOCUMENTS 6,167,531 A * 12/2000 Sliwinski ............ G06F 11/1658
714/13
6,671,705 B1 12/2003 Duprey et al.
(Continued)

*Primary Examiner* — Philip Guyton
(74) *Attorney, Agent, or Firm* — Cooper Legal Group, LLC

(57) ABSTRACT

One or more techniques and/or systems are provided for mirror vote synchronization. For example, a first storage device is located at a first storage site, and a second storage device is located at a second storage site. The second storage device is configured according to a data mirroring configuration where data from the first storage device is mirrored to the second storage device. Mirror vote metadata is generated based upon an up-to-date state of the data mirroring configuration. The mirror vote metadata indicates whether the first storage device and/or the second storage device are up-to-date or not. The mirror vote metadata may be replicated between the first storage site and the second storage site. If the first storage site fails, then the second storage site may provide switchover operation using the second storage device based upon the mirror vote metadata.

20 Claims, 14 Drawing Sheets

Related U.S. Application Data continuation of application No. 14/261,737, filed on Apr. 25, 2014, now Pat. No. 9,361,194.

(51) Int. Cl.
*G06F 11/20* (2006.01)
*H04L 29/08* (2006.01)
*H04L 29/14* (2006.01)

(56) References Cited

U.S. PATENT DOCUMENTS

| | | | |
|---|---|---|---|
| 7,313,724 B1* | 12/2007 | Kekre | G06F 11/2082 |
| | | | 714/12 |
| 8,082,390 B1 | 12/2011 | Fan et al. | |
| 9,361,194 B2* | 6/2016 | Long | G06F 11/2094 |
| 2004/0078644 A1* | 4/2004 | Fujibayashi | G06F 11/2071 |
| | | | 714/6.31 |
| 2006/0179347 A1 | 8/2006 | Anderson et al. | |
| 2007/0094464 A1 | 4/2007 | Sharma et al. | |
| 2015/0269041 A1 | 9/2015 | Long et al. | |
| 2016/0266811 A1* | 9/2016 | Long | G06F 11/2094 |
| 2019/0138216 A1* | 5/2019 | Long | G06F 11/2094 |

\* cited by examiner

MIRROR VOTE SYNCHRONIZATION

RELATED APPLICATION

This application claims priority to and is a continuation of U.S. patent application Ser. No. 15/165,006, filed on May 26, 2016 and titled "MIRROR VOTE SYNCHRONIZATION," which claims priority to U.S. Pat. No. 9,361,194, filed on Apr. 25, 2014 and titled "MIRROR VOTE SYNCHRONIZATION," which claims priority to Indian Application No. 1498/CHE/2014, filed on Mar. 20, 2014 and titled "MIRROR VOTE SYNCHRONIZATION", both applications are incorporated herein by reference.

BACKGROUND

A network storage environment may comprise one or more storage controllers configured to provide client devices with access to data stored on storage devices accessible from the respective storage controllers.

DETAILED DESCRIPTION

Figure 1:
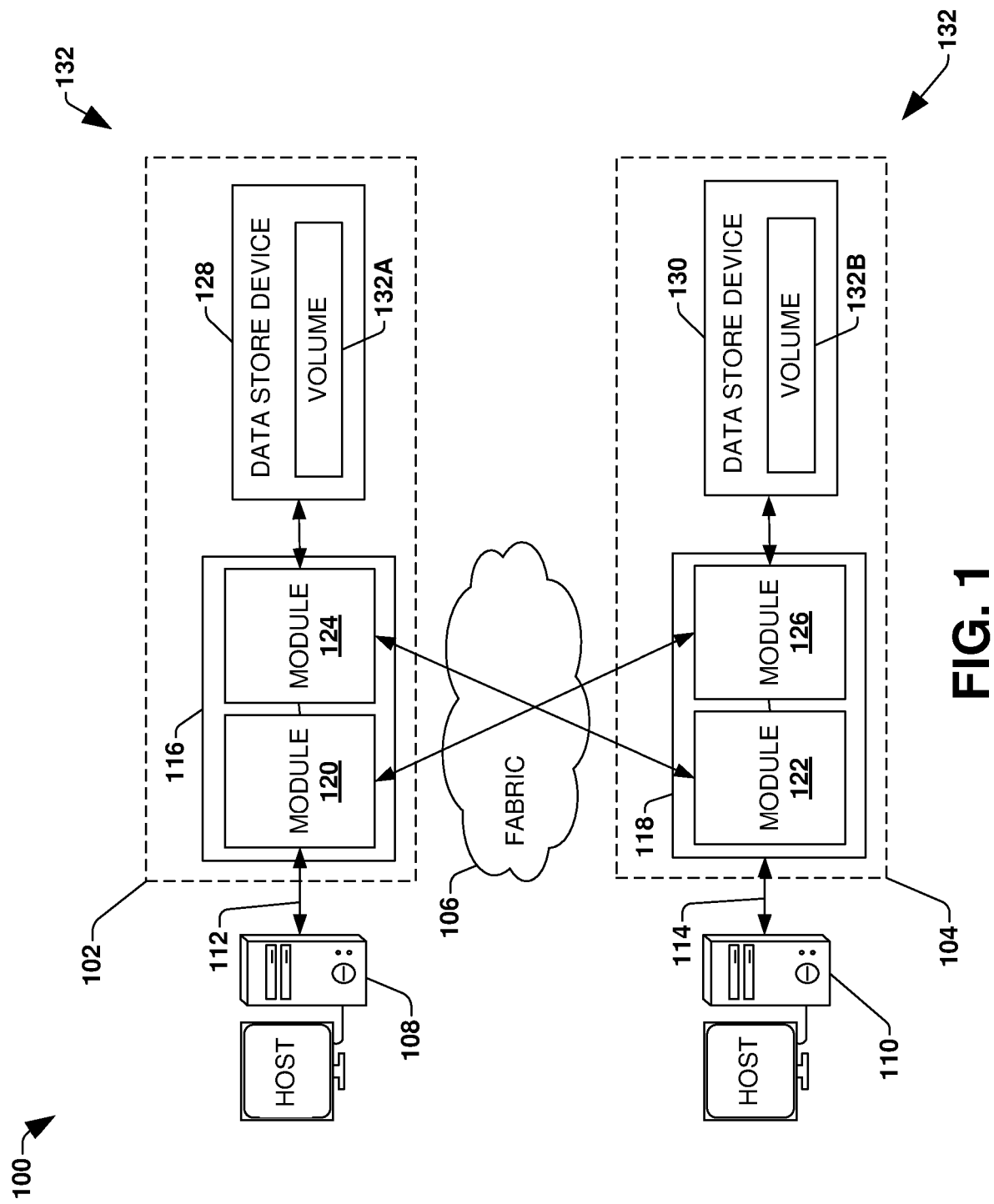
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for mirror vote synchronization are provided. Within a network storage environment, a first storage controller is located at a first storage site (e.g., a first location such as a first city) and a second storage controller is located at a second storage site (e.g., a second location such as a second city). The first storage controller may manage a first storage aggregate (e.g., a logical grouping of storage devices that may be assigned to or owned by the first storage controller) comprising a first storage device located at the first storage site and a second storage device located at the second storage site. The second storage controller may similarly manage a second storage aggregate (e.g., a logical grouping of storage devices that may be assigned to or owned by the second storage controller). Data may be mirrored between storage devices within a storage aggregate, such as from the first storage device to the second storage device and vice versa to allow for switchover operation. For example, if a disaster associated with the first storage site occurs, then the second storage controller at the second storage site may take over the second storage device, located at the second storage site but assigned to the first storage aggregate, for switchover operation so that the second storage controller may provide data access to the first storage aggregate utilizing the data mirrored to the second storage device from the first storage device. Switchover may similarly be implemented by the first storage controller in the event that a disaster at the second storage site occurs. In this way, disaster recovery and/or continued access to data may be provided. Moreover, mirror vote metadata may be implemented so that undesired or stale data is not made available from a switchover operation.

Mirror vote metadata may be generated based upon the data mirroring between the first storage device and the second storage device. In one example, mirror vote metadata may be different than user data stored within storage devices. The mirror vote metadata may indicate whether the first storage device and/or the second storage device is up-to-date (e.g., comprising current or non-stale data) or out-of-date (e.g., comprising non-current or stale data). The mirror vote metadata may be synchronized between the first storage site and the second storage site. For example, the mirror vote metadata may be replicated between a first replication database at the first storage site and a second replicated database at the second storage site. If a storage site fails, then the remaining storage site may consult the mirror vote metadata to determine whether a remaining storage device is up-to-date and thus placed into an operational state for switchover operation or is out-of-date and thus placed into a non-operational state to mitigate data corruption otherwise resulting from using out-of-date data. In this way, switchover operation may provide client devices with I/O access to up-to-date data.

To provide context for mirror vote synchronization, FIG. 1 illustrates an embodiment of a clustered network environment 100. It may be appreciated, however, that the techniques, etc. described herein may be implemented within the clustered network environment 100, a non-cluster network environment, a multi-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration (e.g., utilizing information replicated between replication databases at the first storage site and the second storage site) where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of Network and Data modules, other embodiments may comprise a differing number of these modules. For example, there may be a plurality of Network and/or Data modules interconnected in a cluster that does not have a one-to-one correspondence between the Network and Data modules. That is, different nodes can have a different number of Network and Data modules, and the same node can have a different number of Network modules than Data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the Network module 120 in the node 116 within data storage system 102. The node 116 can forward the data to the data storage device 128 using the Data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the Network module 122 in the host 118 within the data storage system 104 (e.g., which may be remote from the data storage system 102). The host 118 can forward the data to the data storage device 130 using the Data module 126, thereby accessing volume 132B associated with the data storage device 130.

It may be appreciated that mirror vote synchronization may be implemented within the clustered network environment 100. For example, a mirror vote replication component may be implemented between the first data storage system or storage site 102 and the second data storage system or storage site 104. The mirror vote replication component may be configured to synchronize mirror vote metadata between the first data storage system or storage site 102 and the second data storage system or storage site 104. The mirror vote metadata may indicate whether the data storage device 128 and/or the data storage device 130 is up-to-date or out-of-date.

Figure 2:
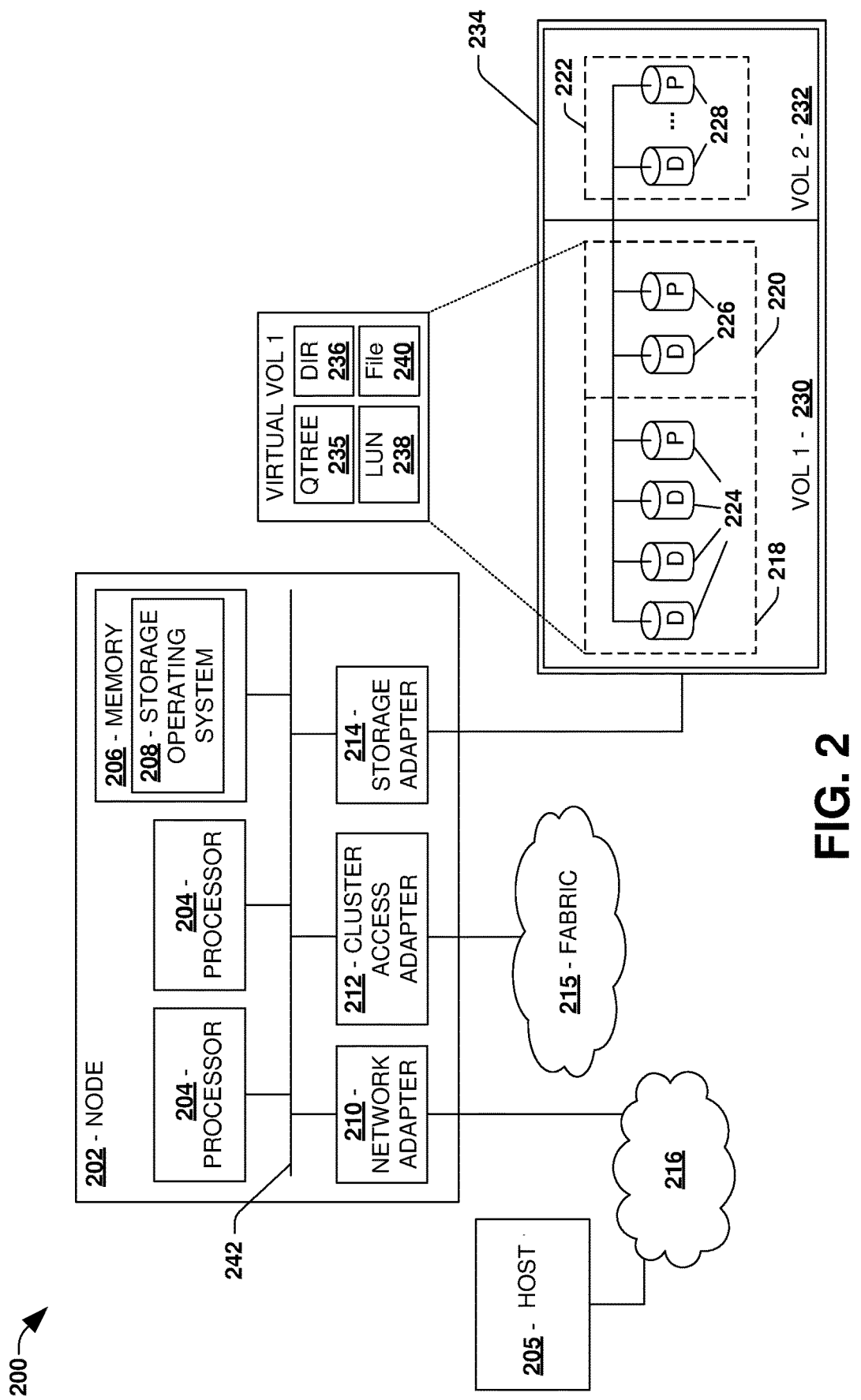
FIG. 2 is a component block diagram illustrating an example data storage system in accordance with one or more of the provisions set forth herein.

FIG. 2 is an illustrative example of a data storage system or storage site 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that mirror vote synchronization may be implemented for the data storage system or storage site 200. For example, a mirror vote replication component may be implemented between the data storage system or storage site 200 and a second data storage system or storage site not illustrated. The mirror vote replication component may be configured to synchronize mirror vote metadata between the data storage system or storage site 200 and the second data storage system or storage site. The mirror vote metadata may indicate whether the data storage devices 234 are up-to-date or out-of-date.

Figure 3:
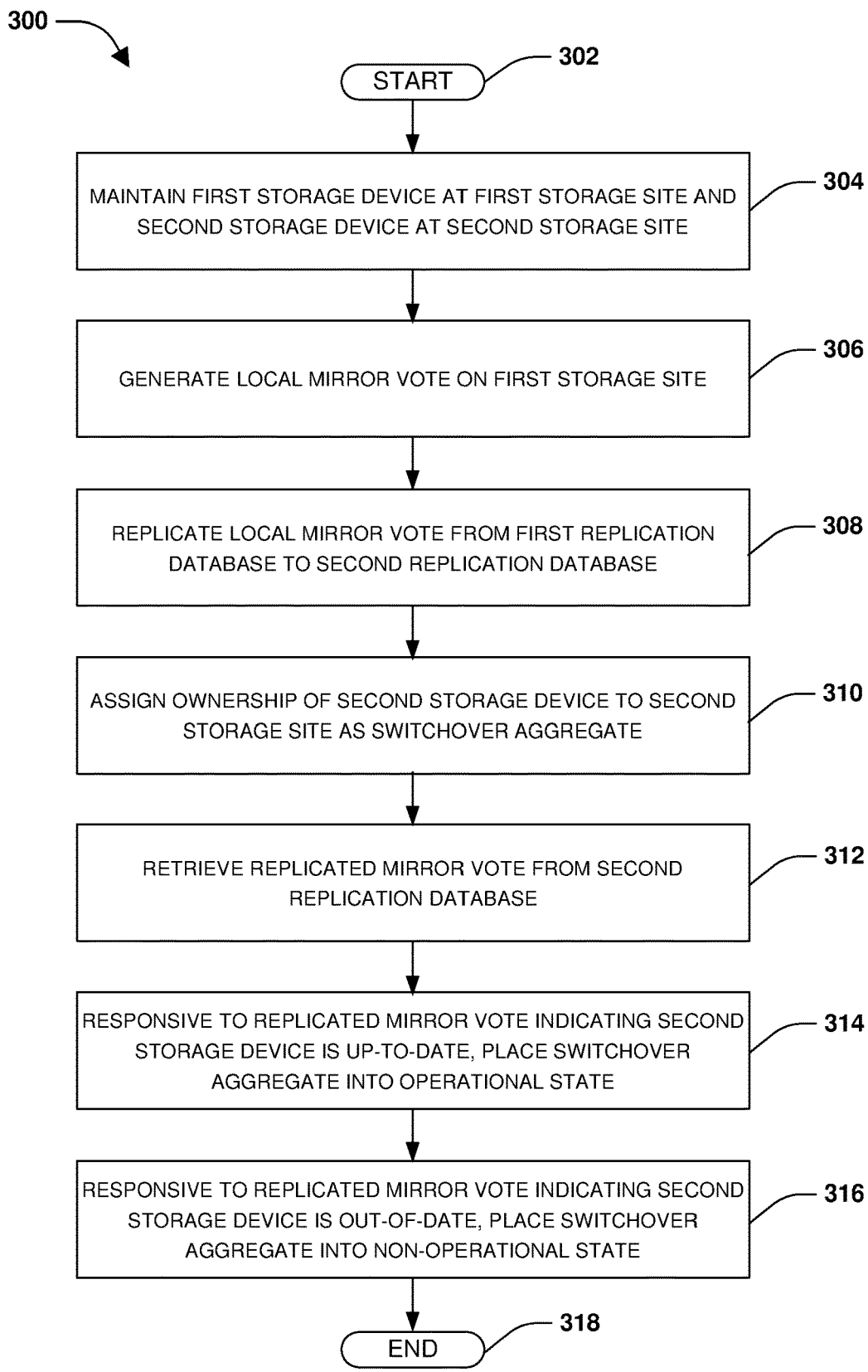
FIG. 3 is a flow chart illustrating an exemplary method of mirror vote synchronization.

One embodiment of mirror vote synchronization is illustrated by an exemplary method 300 of FIG. 3. At 302, the method starts. At 304, a first storage device may be maintained at a first storage site (e.g., comprising a first storage controller) and a second storage device may be maintained at a second storage site (e.g., comprising a second storage controller). The first storage device and the second storage device may be assigned to a first storage aggregate that may be managed by and/or exposed to client devices for I/O access by the first storage controller. The second storage device may be configured according to a data mirroring configuration for the first storage device (e.g., when data is written to the first storage device, such data may be mirrored to the second storage device). In this way, the second storage controller and/or other storage controllers may be configured as a switchover controller for the first storage controller such that the second storage controller may provide client devices with switchover I/O access to the second storage device in the event the first storage site has a disaster.

At 306, a local mirror vote may be generated on the first storage site based upon an up-to-date state of the data mirroring configuration (e.g., the up-to-date state may indicate whether the first storage device and/or the second storage device are up-to-date, such as comprising up-to-date data, or out-of-date such as comprising out-of-date data). In an example, the local mirror vote may be updated as the up-to-date state of the data mirroring configuration changes (e.g., the local mirror vote may be changed to indicate that the second storage device is out-of-date due to a communication failure of data that being mirrored from the first storage device to the second storage device). In an example, the local mirror vote may be stored within a first root storage location of the first storage site (e.g., within a first local mailbox). The first root storage location may be different than the first storage aggregate such that the first storage aggregate does not comprise the first root storage location and/or the local mirror vote.

In an example, the local mirror vote may be stored within a first data replication database for the first storage controller at the first storage site. At 308, the local mirror vote may be replicated from the first replication database to a second replication database for a second storage controller at the second storage site to create a replicated mirror vote. In an example, the first replication database and the second replication database may be associated with a cluster-wide replication service (e.g., which may be operational based upon initialization of storage aggregates and/or storage controllers).

A disaster of the first storage site may be identified (e.g., resulting in unavailability of the first storage controller and/or the first storage device). At 310, ownership of the second storage device may be assigned to the second storage site (e.g., assignment from the first storage controller to the second storage controller) as a switchover first storage aggregate for the first aggregate. That is, the switchover first storage aggregate may remain as the first aggregate, but is currently owned by the second storage controller. In an example, the switchover first storage aggregate may be initialized (e.g., performing a boot sequence). During the initialization, the second replication database may not be available (e.g., because the second replication database may be associated with the cluster-wide replication service that is available after storage aggregates and/or storage controllers are initialized). Accordingly, the switchover first storage aggregate may be initialized in an offline state. A flag may be set for the switchover first storage aggregate. The flag may specify that the switchover first storage aggregate is in the offline state because the mirror vote metadata was unavailable for the switchover first storage aggregate during the initializing.

At 312, the replicated mirror vote may be retrieved from the second replication database. In an example, the replicated mirror vote may be retrieved based upon a determination that the second replication database is online, and thus the flag may be removed from the switchover first storage aggregate based upon retrieving the replicated mirror vote. In an example, the replicated mirror vote may be stored within a second root storage location of the second storage site (e.g., within a second local mailbox). The second root storage location may be different than the switchover first storage aggregate such that the switchover first storage aggregate does not comprise the second root storage location and/or the replicated mirror vote.

At 314, responsive to the replicated mirror vote indicating that the second storage device is up-to-date (e.g., comprising current or non-stale data), the switchover first storage aggregate may be placed into the operational state. At 316, responsive to the replicated mirror vote indicating that the second storage device is out-of-date (e.g., comprising non-current or stale data, for example, due to the first storage device comprising data that was not mirrored to the second storage device because of a communication data mirroring outage), the switchover first storage aggregate may be placed into a non-operational state, which may mitigate data corruption or other issues resulting from using stale data.

In an example of the switchover first storage aggregate being in the operational state, data access may be facilitated to the switchover first storage aggregate utilizing the second storage device. For example, the second storage site, such as the second storage controller that took ownership of the second storage device, may provide client devices with switchover I/O access to the second storage device. A switchover mirror vote may be generated based upon the data access. The switchover mirror vote may indicate that the first storage device is out-of-date and that the second storage device is up-to-date. The switchover mirror vote may be stored within the second root storage location of the second storage site and the second replication database.

In an example of the first storage site being restored, the switchover mirror vote may be replicated from the second replication database to the first replication database as a restored mirror vote based upon the first storage site being restored. Ownership of the second storage device may be assigned to the first storage site for selective operation of the first storage device and/or the second storage device as the first aggregate based upon the restored mirror vote. In an example, the restored mirror vote may be evaluated with an up-to-date mirror vote stored within the first root storage location of the first storage site. Responsive to the restored mirror vote being different than the up-to-date mirror vote (e.g., the up-to-date mirror vote may indicate that the first storage device and the second storage device are both up-to-date and are in sync, whereas the restored mirror vote may indicate that the second storage device is up-to-date and the first storage device is out-of-date), either the restored mirror vote or the up-to-date mirror vote may be selected for the selective operation of the first storage device and/or the second storage device based upon a tie-breaker technique (e.g., the mirror vote with the newest timestamp may be selected).

In another example of the first storage site being restored, ownership of the first storage device may be assigned to the second storage site, such as the second storage controller, based upon the first storage site being restored. Synchronization may be performed between the second storage device and the first storage device (e.g., the second storage controller of the second storage site may synchronize the first storage device with data from the second storage device). A synchronized mirror vote may be generated based upon the synchronization. The synchronized mirror vote may indicate that both the first storage device and the second storage device are up-to-date. The synchronized mirror vote may be provided to the first storage site (e.g., replicated from the second replicated database to the first replicated database). Ownership of the first storage device and the second storage device may be assigned to the first storage site, such as the first storage controller. The first storage site, such as the first storage controller, may selectively operate the first storage device and/or the second storage device based upon the synchronized mirror vote (e.g., both the first storage device and the second storage device may be placed into the operational state based upon the synchronized mirror vote indicating that both storage devices are up-to-date).

In another example of the first storage site being restored, ownership of the first storage device may be assigned to the second storage site, such as to the second storage controller, based upon the first storage site being restored. Synchronization may be performed between the second storage device and the first storage device (e.g., the second storage controller of the second storage site may synchronize the first storage device with data from the second storage device). A failure associated with the second storage device may be identified during the synchronization. A heal failure mirror vote may be generated based upon the failure. The heal failure mirror vote may indicate that the first storage device is up-to-date and that the second storage device is out-of-date due to the failure. Responsive to identifying restoration of the second storage device, the heal failure mirror vote may be provided to the first storage site. Ownership of the first storage device and the second storage device may be assigned to the first storage site, such as the first storage controller. The first storage site may selectively operate the first storage device and/or the second storage device based upon the heal failure mirror vote (e.g., merely the first storage device may be placed into the operational state based upon the heal failure mirror vote indicating that the first storage device is up-to-date and that the second storage device is out-of-date). At 318, the method ends.

Figure 4A:
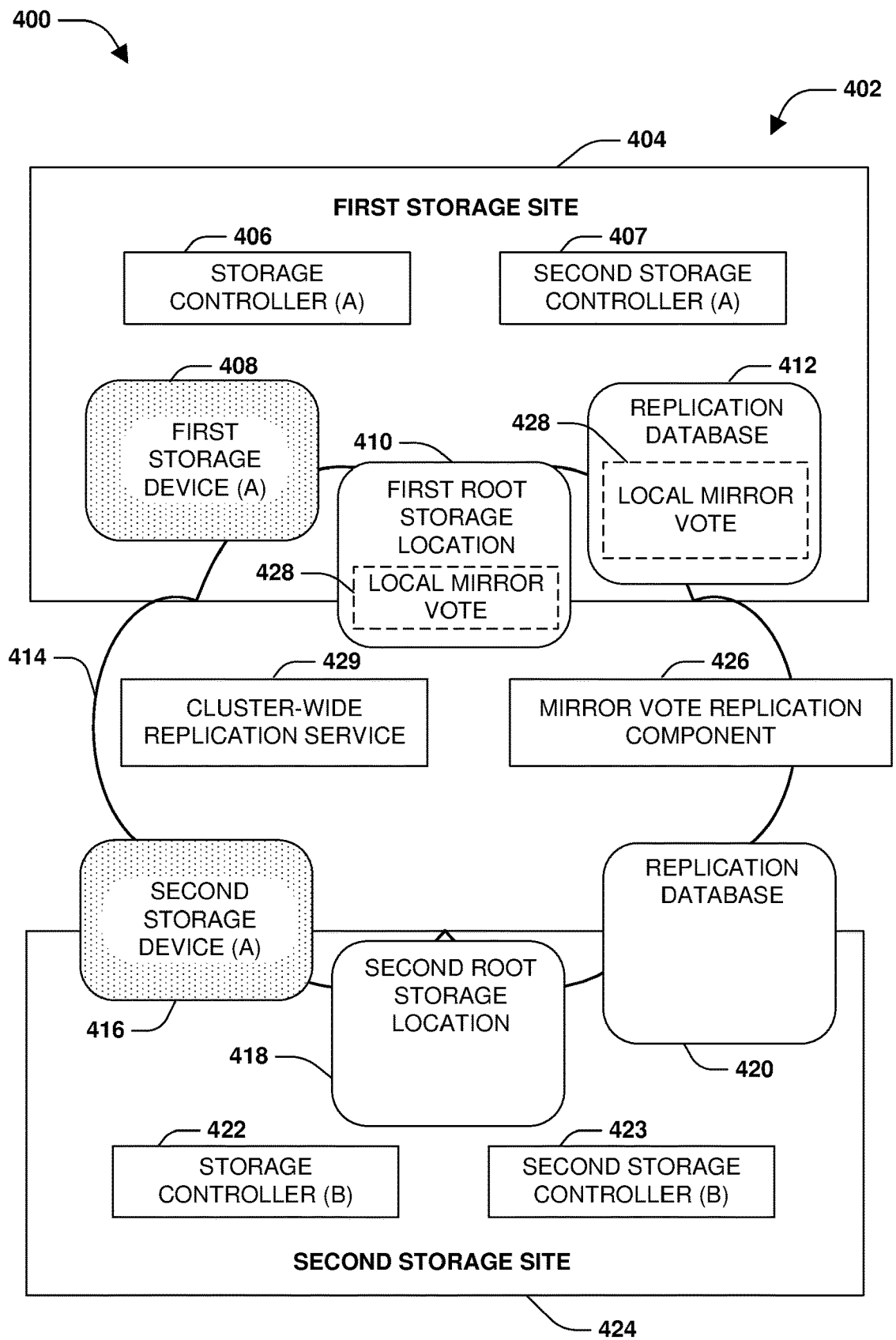
FIG. 4A is an example of a first storage site comprising a storage controller (A) configured to provide data access to a storage aggregate (A) associated with a first storage device (A) and a second storage device (A).

FIGS. 4A-4I illustrate examples of a system 402, comprising a mirror vote replication component 426, for mirror vote synchronization. FIG. 4A illustrates an example 400 of a first storage site 404 comprising a storage controller (A) 406 and/or other storage controllers (e.g., a second storage controller (A) 407 configured according to a high availability configuration for the storage controller (A) 406 such that the second storage controller (A) 407 provides failover operation for the storage controller (A) 406 in the event the storage controller (A) 406 fails) configured to provide data access to a storage aggregate (A) associated with a first storage device (A) 408 and a second storage device (A) 416. The second storage device (A) 416 may be configured according to a data mirroring configuration for the first storage device (A) 408 (e.g., data may be mirrored from the first storage device (A) 408 to the second storage device (A) 416). The first storage device (A) 408 may be located at the first storage site 404, and the second storage device (A) 416 may be located at a second storage site 424. The second storage site 424 may comprise a storage controller (B) 422 and/or other storage controllers (e.g., a second storage controller (B) 423 configured according to a high availability configuration for the storage controller (B) 422 such that the second storage controller (B) 423 provides failover operation for the storage controller (B) 422 in the event the storage controller (B) 423 fails) configured to provide switchover operation for the storage controller (A) 406 and/or the second storage controller (A) 407 in the event the first storage site 404 has a disaster. For example, the storage controller (B) 422 may provide client devices with switchover I/O access to data mirrored from the first storage device (A) 408 to the second storage device (A) 416.

A local mirror vote 428 may be generated based upon an up-to-date state of the data mirroring configuration. The local mirror vote 428 may indicate whether the first storage device (A) 408 and/or the second storage device (A) 416 are up-to-date or out-of-date. The local mirror vote 428 may be stored within a first root storage location 410 for the storage controller (A) 406 of the first storage site 404. In an example, root storage locations may be maintained for respective storage controllers (e.g., an additional root storage location, not illustrated, may be maintained for the second storage controller (A) 407). The local mirror vote 428 may be stored within a first replication database 412 of the first storage site 404 for replication by the mirror vote replication component 426 to a second replication database 420 of the second storage site 424. In an example, the mirror vote replication component 426 may be implemented as a cluster-wide replication service 429 across a data storage network 414.

Figure 4B:
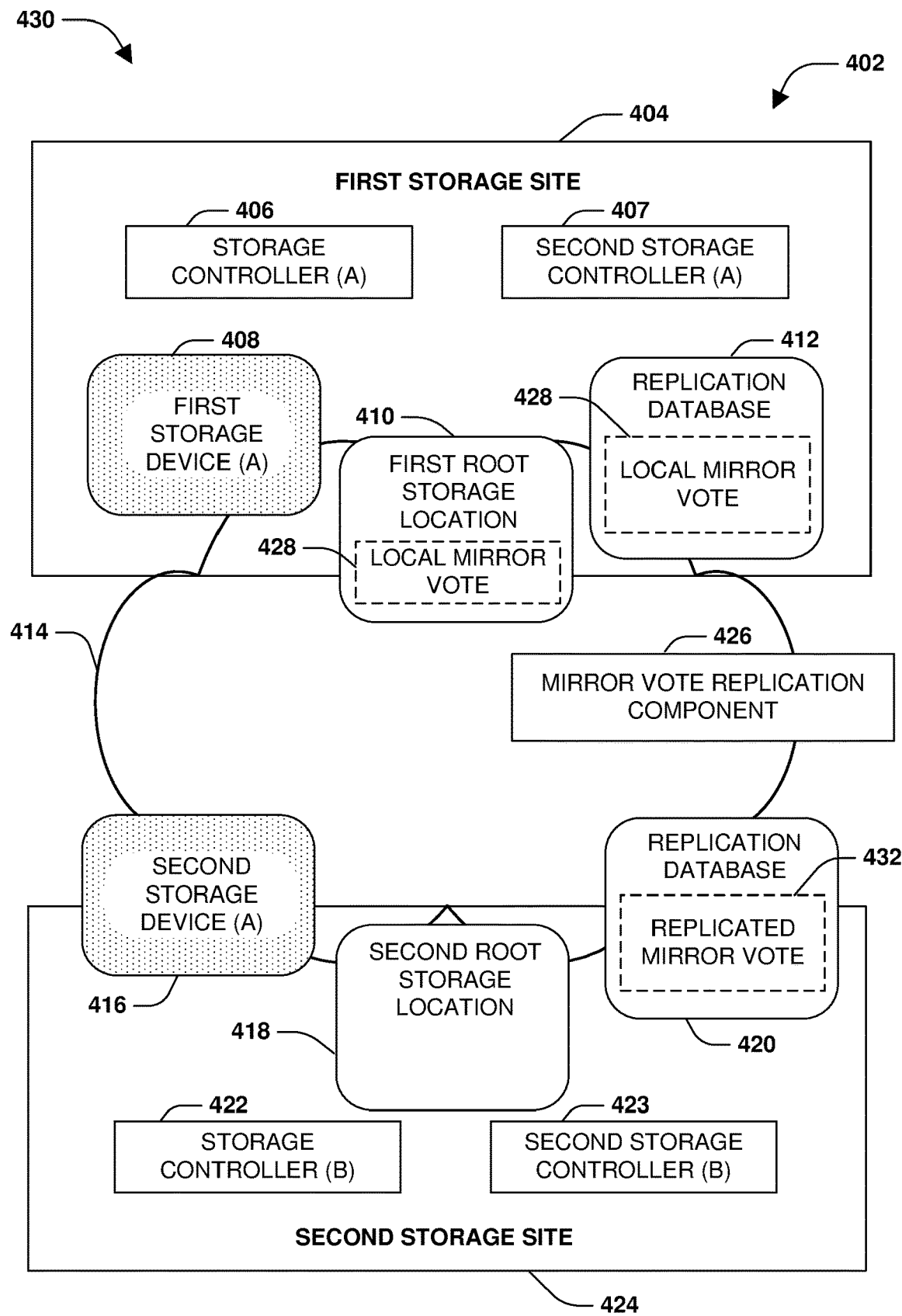
FIG. 4B is an example of mirror vote synchronization.

FIG. 4B illustrates an example 430 of mirror vote synchronization. The mirror vote replication component 426 may replicate the local mirror vote 428 from the first replication database 412 to the second replication database 420 as a replicated mirror vote 432. As the local mirror vote 428 is updated (e.g., based upon changes to the up-to-date state of the data mirroring configuration indicating whether up-to-date data is mirrored from the first storage device (A) 408 to the second storage device (A) 416)), the mirror vote replication component 426 may replicate the updated local mirror vote to the second replication database 420.

Figure 4C:
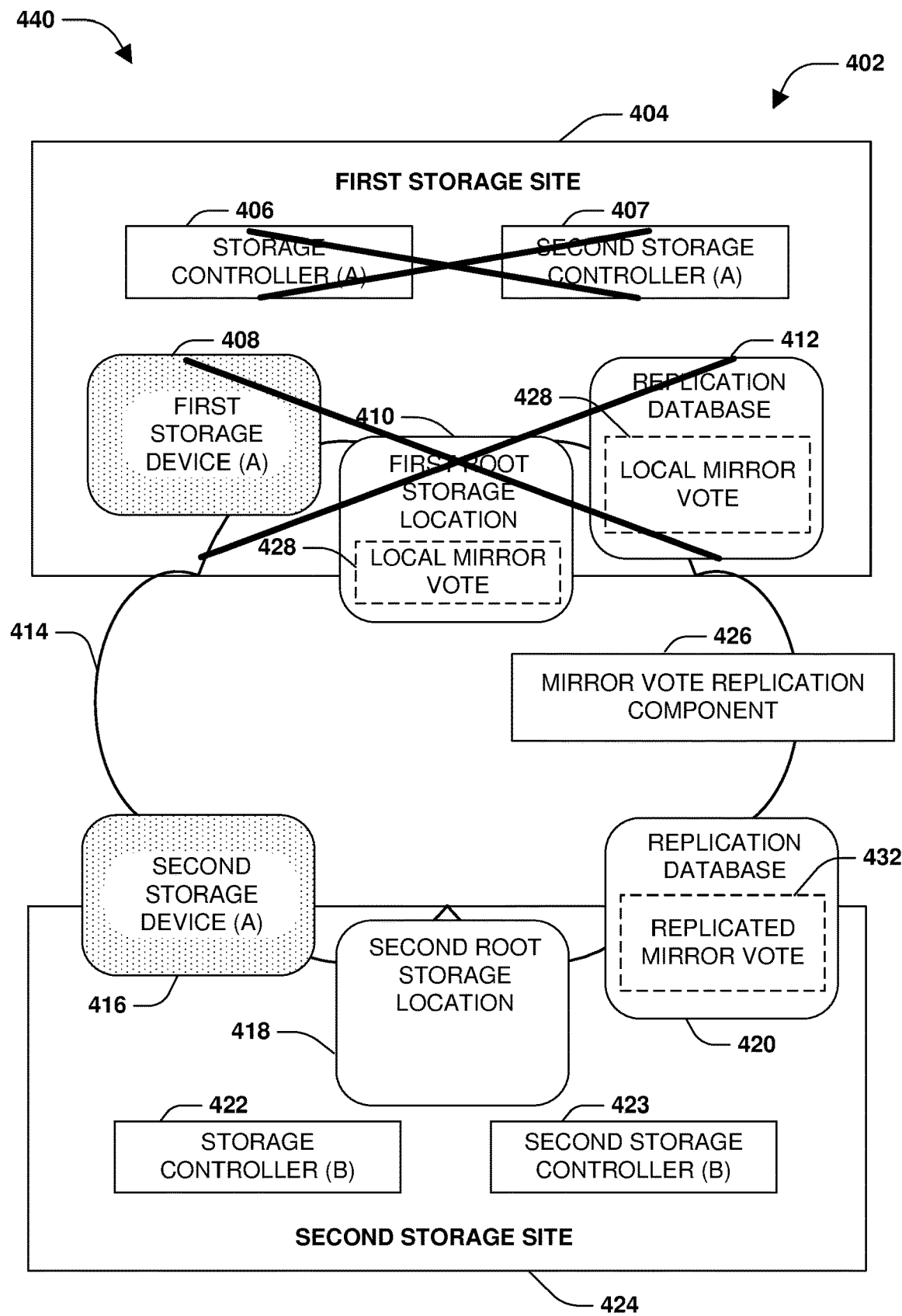
FIG. 4C is an example of identifying a disaster of a first storage site.
Figure 4D:
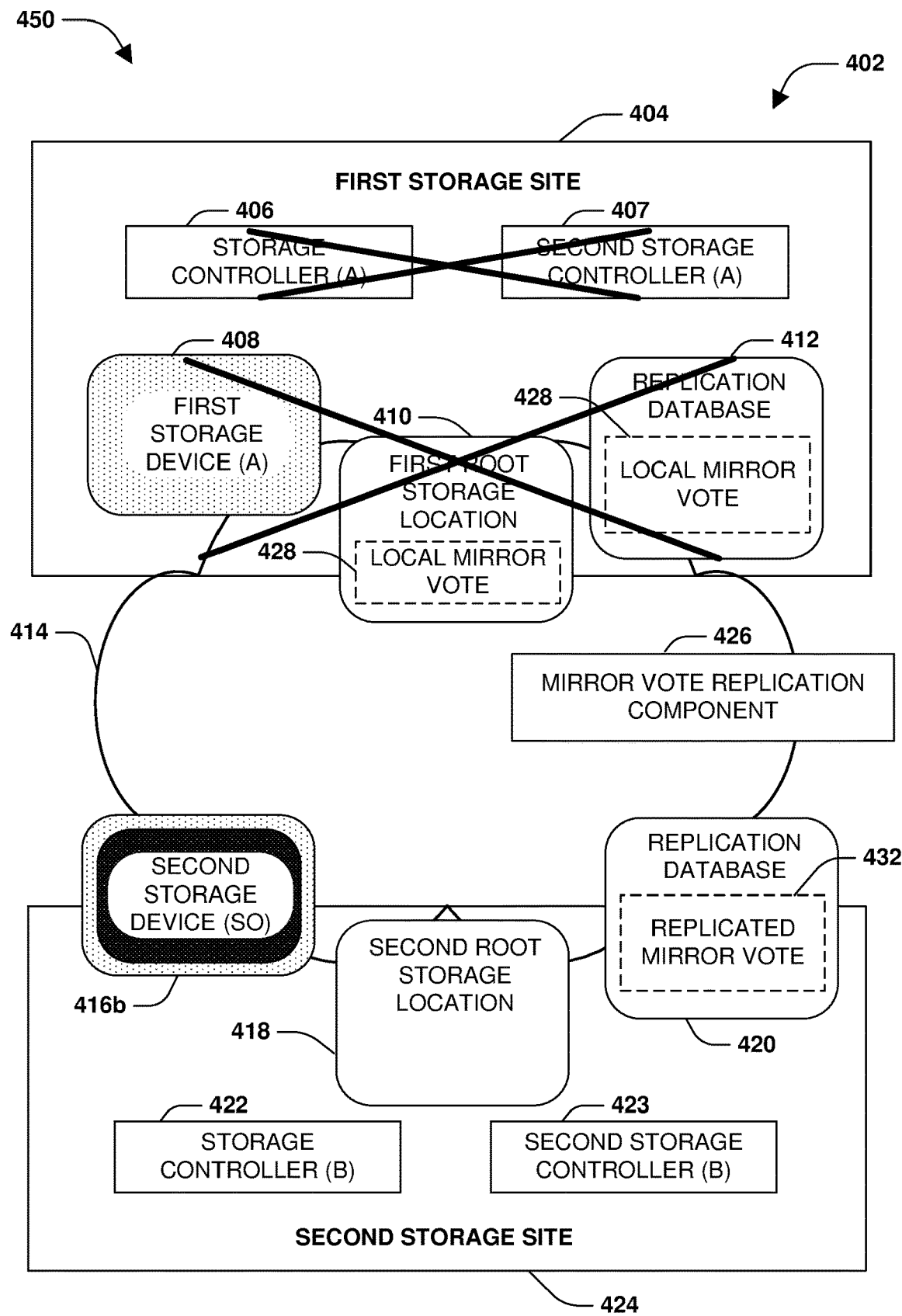
FIG. 4D is an example of a storage controller (B) taking ownership of a second storage device (A).
Figure 4E:
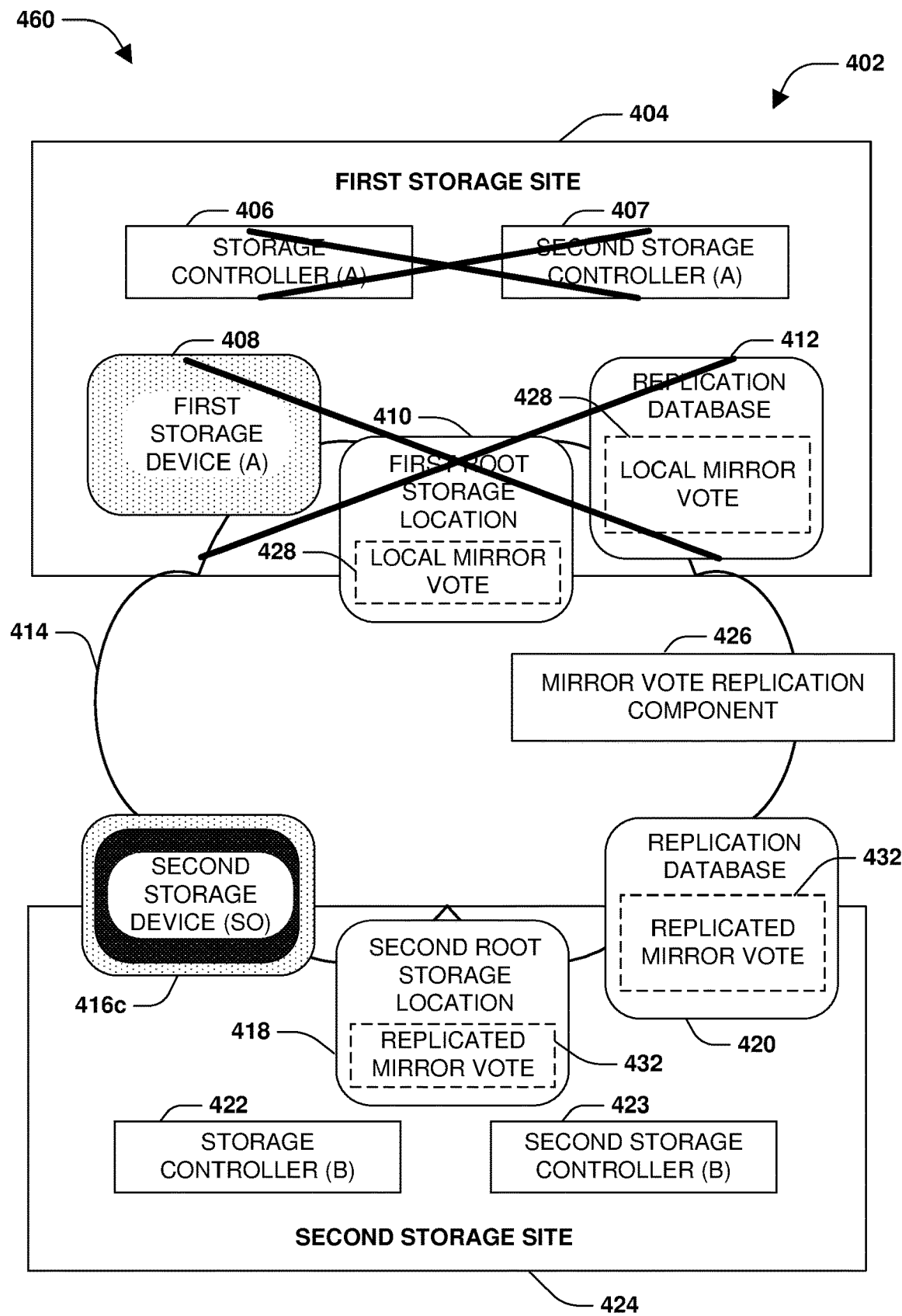
FIG. 4E is an example of retrieving a replicated mirror vote from a second replication database.

FIG. 4C illustrates an example 440 of identifying a disaster of the first storage site 404. In an example, the disaster affects availability of the storage controller (A) 406, the second storage controller (A) 407, the first root storage location 410, and/or access through the first storage site 404 to the first storage device (A) 408 and/or the second storage device (A) 416. FIG. 4D illustrates an example 450 of the storage controller (B) 422 taking ownership of the second storage device (A) 416. Ownership of the second storage device (A) 416 may be reassigned to the storage controller (B) 422, resulting in a switchover first storage aggregate comprising a second storage device (SO) 416b. FIG. 4E illustrates an example 460 of retrieving the replicated mirror vote 432 from the second replication database 420. In an example, the replicated mirror vote 432 is stored within a second root storage location 418 of the second storage site 424. The replicated mirror vote 432 may be evaluated to determine whether to place the second storage device (SO) 416b into an operational state or a non-operational state. For example, the second storage device (SO) 416b may be placed into the operational state based upon the replicated mirror vote 432 indicating that the second storage device (SO) 416b is up-to-date (e.g., comprises up-to-date data mirrored from the first storage device (A) 408), resulting in an operational second storage device (SO) 416c.

Figure 4F:
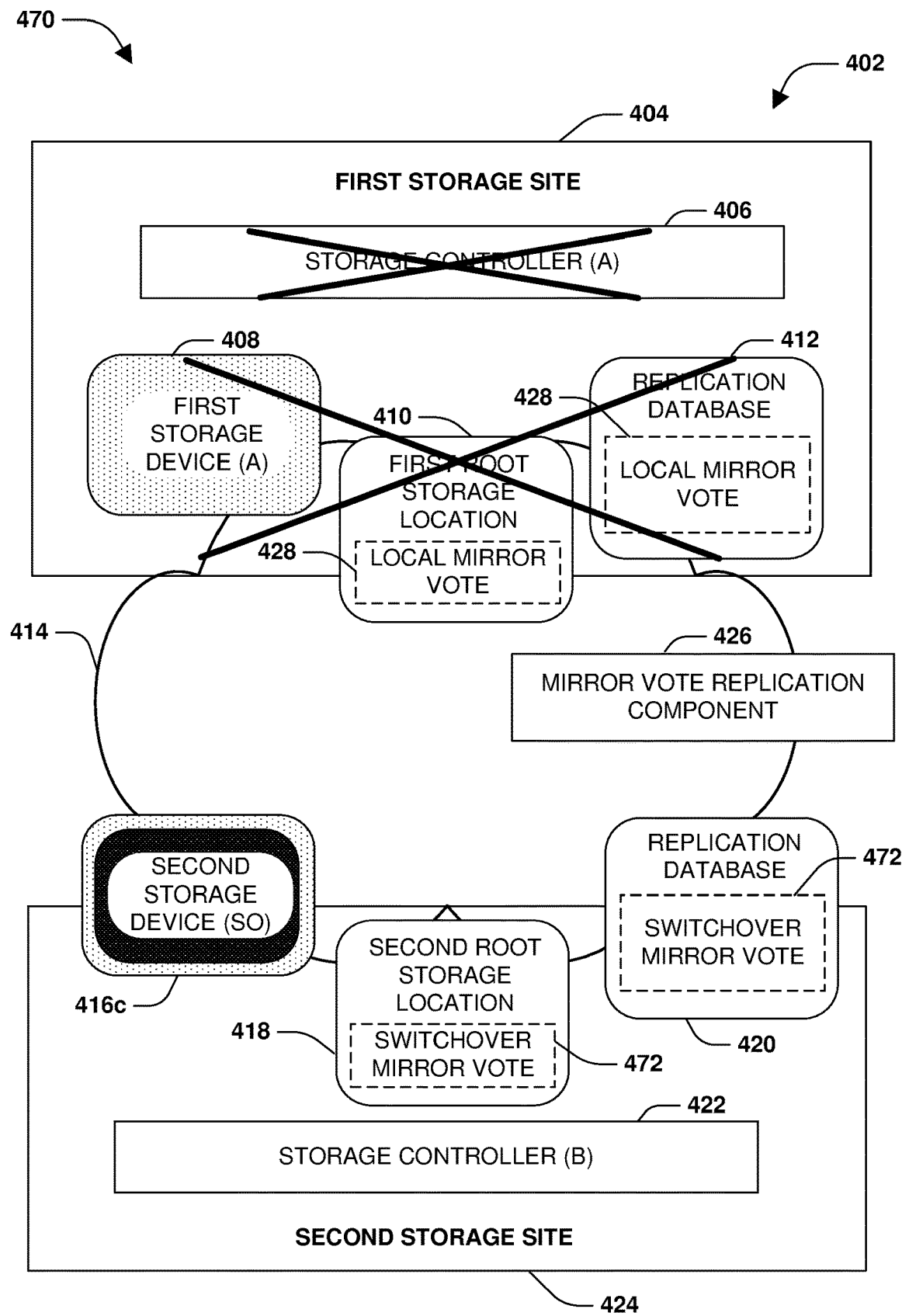
FIG. 4F is an example of facilitating data access to a switchover first storage aggregate utilizing an operational second storage device (SO).

FIG. 4F illustrates an example 470 of facilitating data access to the switchover first storage aggregate utilizing the operational second storage device (SO) 416c. For example, the storage controller (B) 422 may provide client devices with I/O access to the operational second storage device (SO) 416c. A switchover mirror vote 472 may be generated based upon the data access. The switchover mirror vote 472 may indicate that the first storage device (A) 408 is out-of-date and that the operational second storage device (SO) 416c is up-to-date (e.g., based upon new data that was written to the operational second storage device (SO) 416c and not mirrored to the first storage device (A) 408 due to the disaster of the first storage site 404).

Figure 4G:
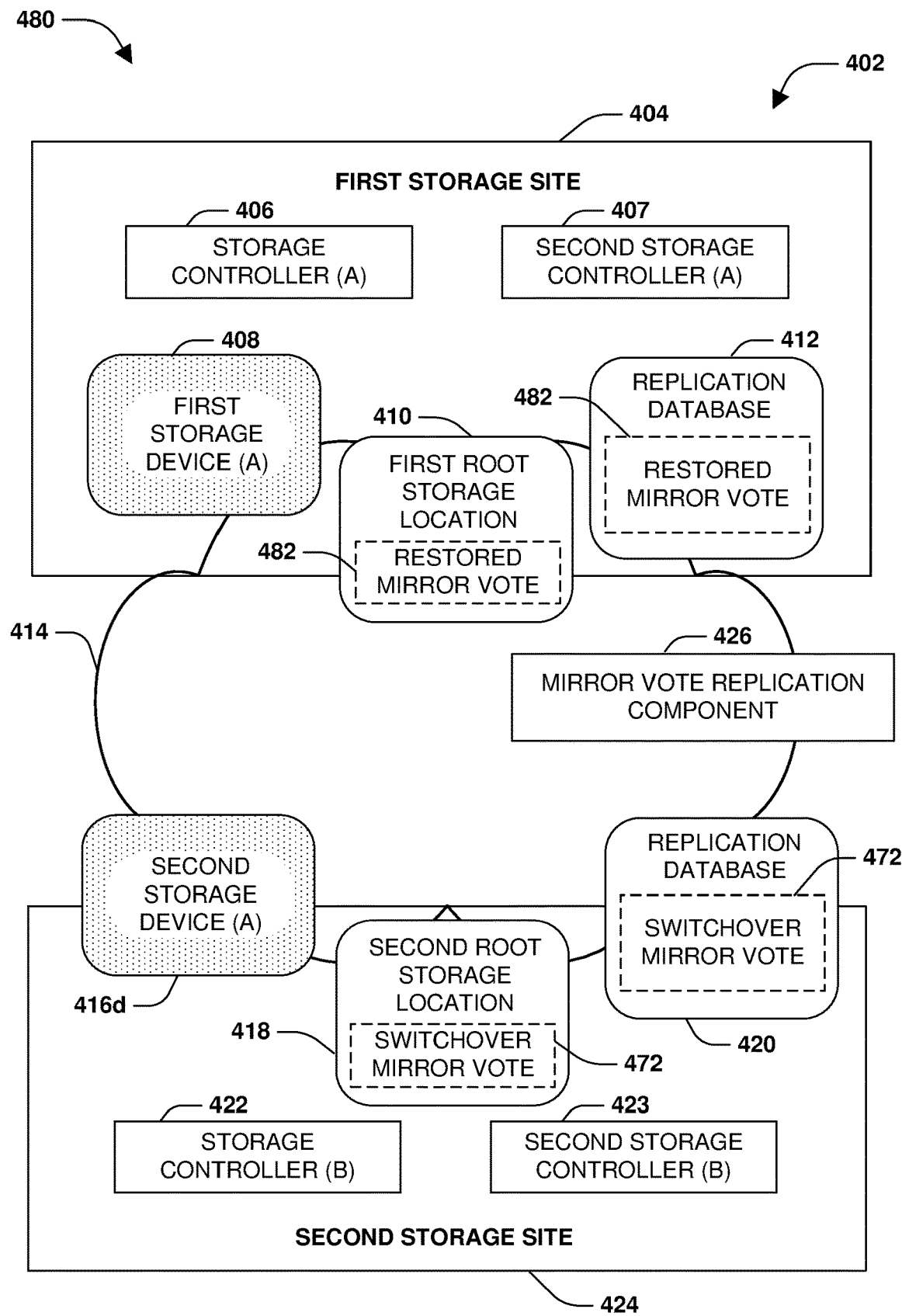
FIG. 4G is an example of restoring a storage aggregate (A).

FIG. 4G illustrates a first example 480 of restoring the storage aggregate (A). For example, restoration of the first storage site 404 may be identified. The mirror vote replication component 426 may be configured to replicate the switchover mirror vote 472 from the second replication database 420 to the first replication database 412 to create a restored mirror vote 482. In an example, the restored mirror vote 482 may be stored within the first root storage location 410. Ownership of the operational second storage device (SO) 416c may be reassigned from the second storage site 424 to the first storage site 404 (e.g., the storage controller (A) 406 may take ownership of the operational second storage device (SO) 416c) resulting in a second storage device (A) 416d as the storage aggregate (A). The storage controller (A) 406 may place the first storage device (A) 408 and/or the second storage device (A) 416d into either the operational state or the non-operational state based upon the restored mirror vote 482.

Figure 4H:
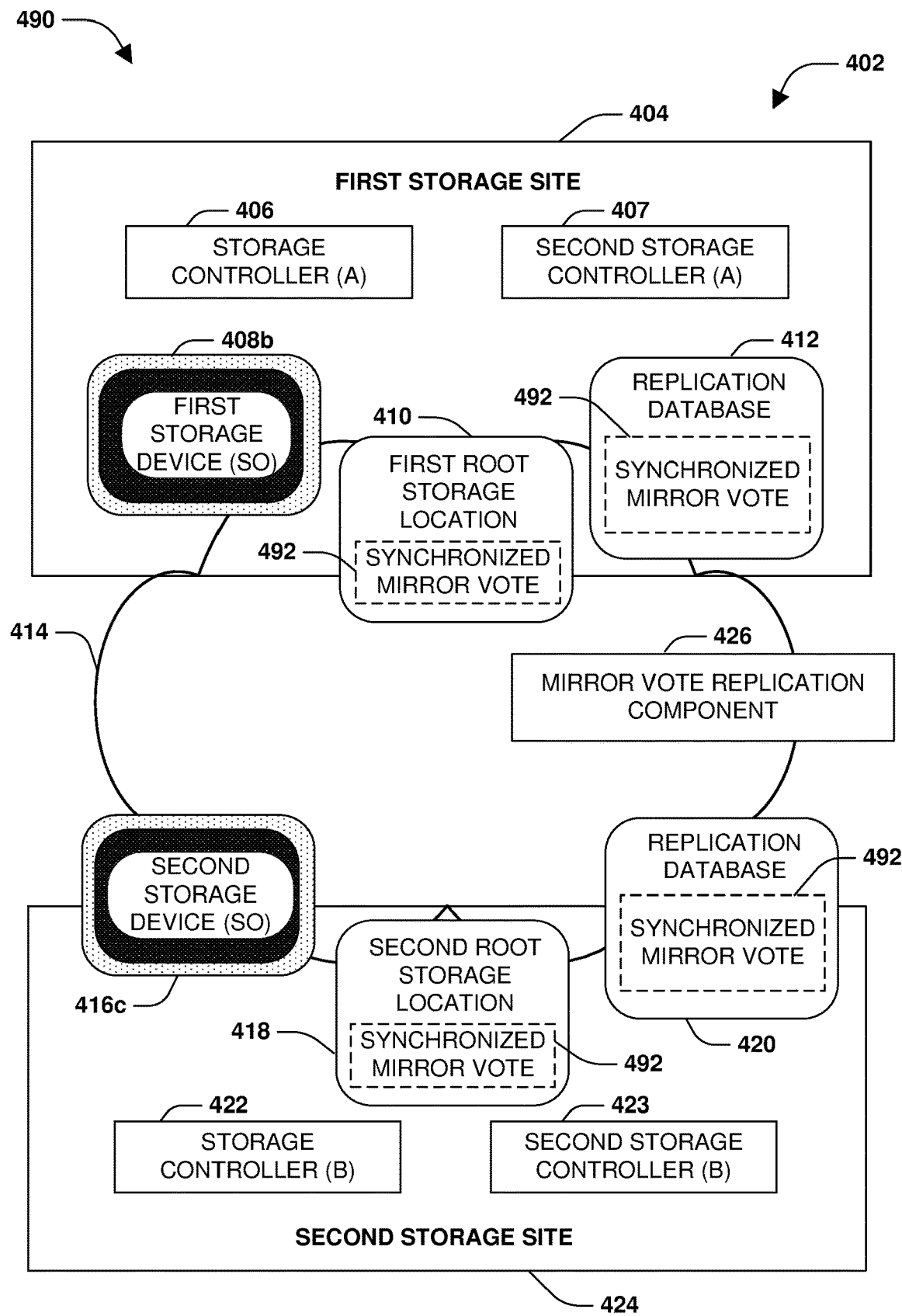
FIG. 4H is an example of restoring a storage aggregate (A).

FIG. 4H illustrates a second example 490 of restoring the storage aggregate (A). For example, restoration of the first storage site 404 may be identified. Ownership of the first storage device (A) 408 may be reassigned from the first storage site 404 to the second storage site 424 (e.g., the storage controller (B) 422 may take ownership of the first storage device (A) 408), resulting in a first storage device (SO) 408b as the switchover first storage aggregate. A synchronization may be performed between the first storage device (SO) 408b and the operational second storage device (SO) 416c (e.g., up-to-date data may be synchronized from the operational second storage device (SO) 416c to the first storage device (SO) 408b). A synchronized mirror vote 492 (e.g., indicating that the operational second storage device (SO) 416c and the first storage device (SO) 408b are up-to-date) may be generated based upon the synchronization. The mirror vote replication component 426 may replicate the synchronized mirror vote 492 from the second replication database 420 to the first replication database 412. Ownership of the operational second storage device (SO) 416c and the first storage device (SO) 408b may be reassigned from the second storage site 424 to the first storage site 404 (e.g., the storage controller (A) 406 may take ownership of the operational second storage device (SO) 416c and the first storage device (SO) 408b), resulting in a first storage device (A) and a second storage device (A) as the storage aggregate (A). The storage controller (A) 406 may place the first storage device (A) and/or the second storage device (A) into either the operational state or the non-operational state based upon the synchronized mirror vote 492.

Figure 4I:
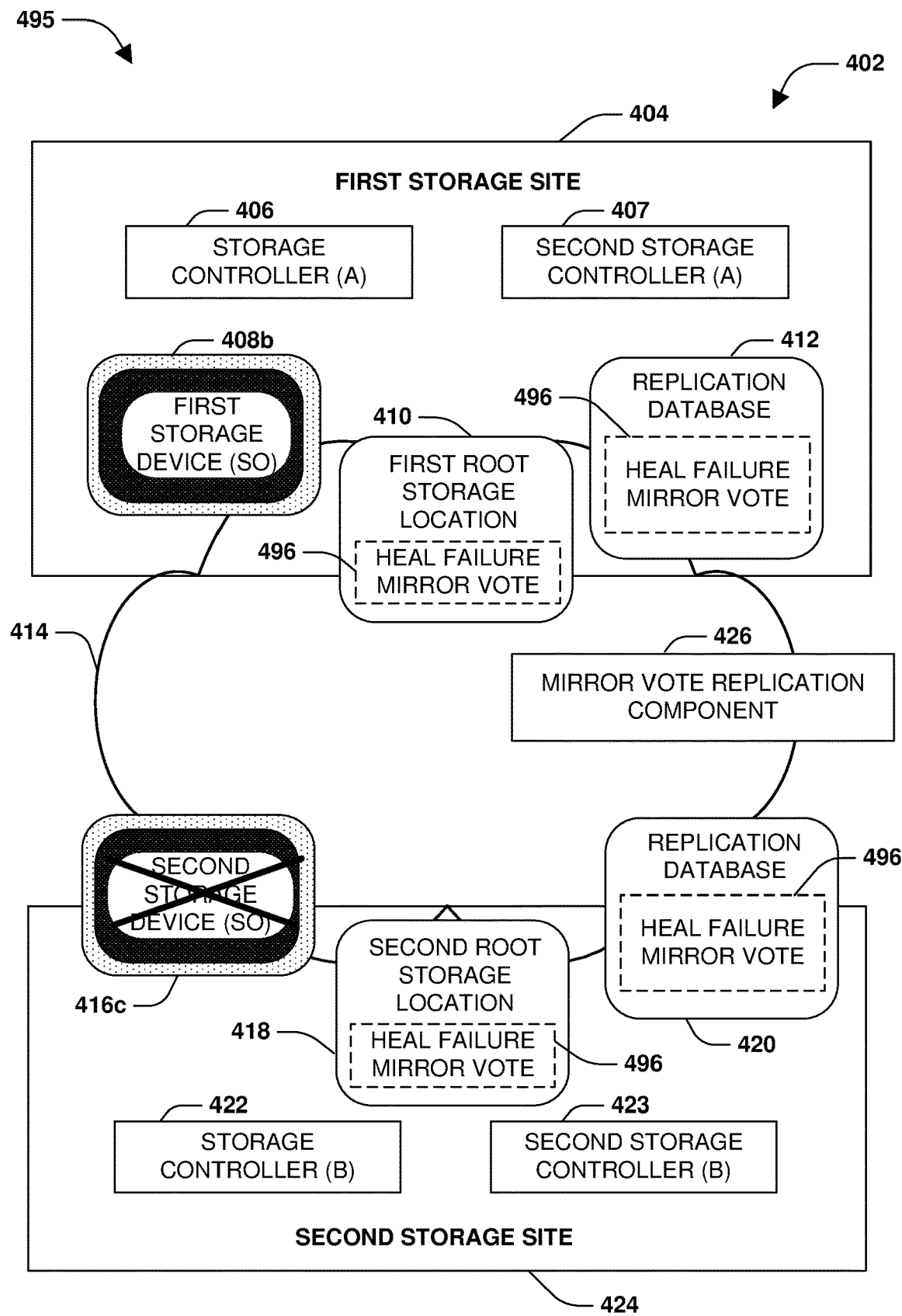
FIG. 4I is an example of restoring a storage aggregate (A).

FIG. 4I illustrates a second example 495 of restoring the storage aggregate (A). For example, restoration of the first storage site 404 may be identified. Ownership of the first storage device (A) 408 may be reassigned from the first storage site 404 to the second storage site 424 (e.g., the storage controller (B) 422 may take ownership of the first storage device (A) 408), resulting in a first storage device (SO) 408b as the switchover first storage aggregate. A synchronization may be performed between the first storage device (SO) 408b and the operational second storage device (SO) 416c (e.g., up-to-date data may be synchronized from the operational second storage device (SO) 416c to the first storage device (SO) 408b). In an example, a failure associated with the operational second storage device (SO) 416c may be identified. A heal failure mirror vote 496 may be generated based upon the failure. Responsive to identifying restoration of the operational second storage device (SO) 416c, the mirror vote replication component 426 may replicate the heal failure mirror vote 492 from the second replication database 420 to the first replication database 412. Ownership of the operational second storage device (SO) 416c and the first storage device (SO) 408b may be reassigned from the second storage site 424 to the first storage site 404 (e.g., the storage controller (A) 406 may take ownership of the operational second storage device (SO) 416c and the first storage device (SO) 408b), resulting in a first storage device (A) and a second storage device (A) as the storage aggregate (A). The storage controller (A) 406 may place the first storage device (A) and/or the second storage device (A) into either the operational state or the non-operational state based upon the heal failure mirror vote 492. For example, the first storage device (A), but not the second storage device (A), may be placed into the operational state for client device I/O access based upon the heal failure mirror vote 492 indicating that the first storage device (A) is up-to-date and that the second storage device (A) is out-of-date based upon the failure.

Figure 5:
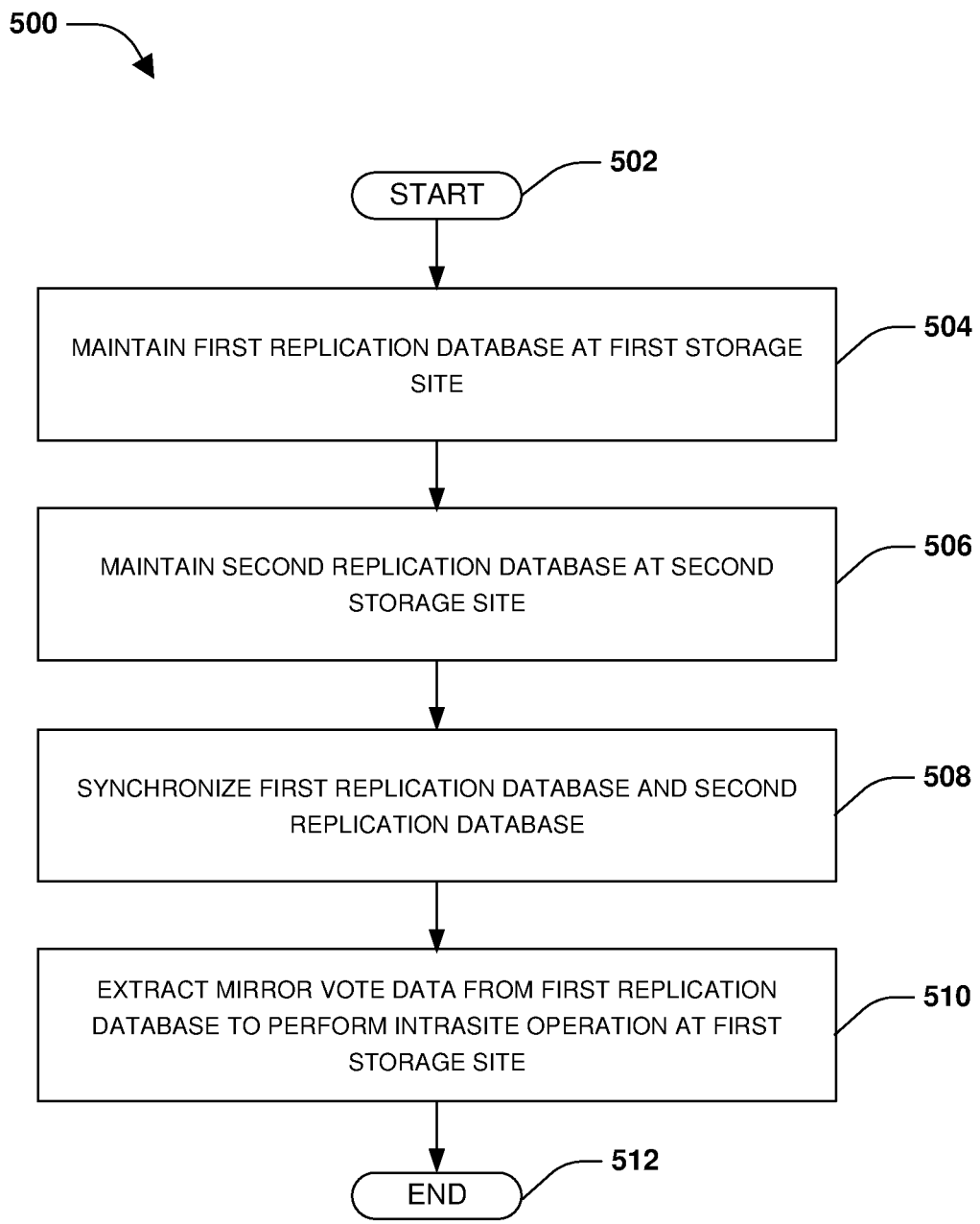
FIG. 5 is a flow chart illustrating an exemplary method of mirror vote utilization.

One embodiment of mirror vote utilization is illustrated by an exemplary method 500 of FIG. 5. At 502, the method starts. At 504, a first replication database may be maintained at a first storage site comprising a first storage controller configured to provide access to a first storage device. At 506, a second replication database may be maintained at a second storage site comprising a second storage controller configured to provide access to a second storage device. At 508, the first replication database and the second replication database may be synchronized. At 510, mirror vote data may be extracted from the first replication database to perform an intrasite operation at the first storage device. In an example, a storage device may be brought online at the first storage device as the intrasite operation. If a root storage location, comprising information used to bring the first storage device online, is unavailable, then such information (e.g., mirror vote data) may be extracted from the first replication database. In another example, a first set of storage devices are migrated from the first storage controller to a third storage controller at the first storage site as the intrasite operation. If a storage device within the set of storage devices was not migrated due to unavailability of the storage device, then a first root storage location of the first storage controller may lack information about the unmigrated storage device when it becomes available. Accordingly, the first storage controller may extract such information (e.g., mirror vote data) from the first replication database. At 512, the method ends.

Figure 6:
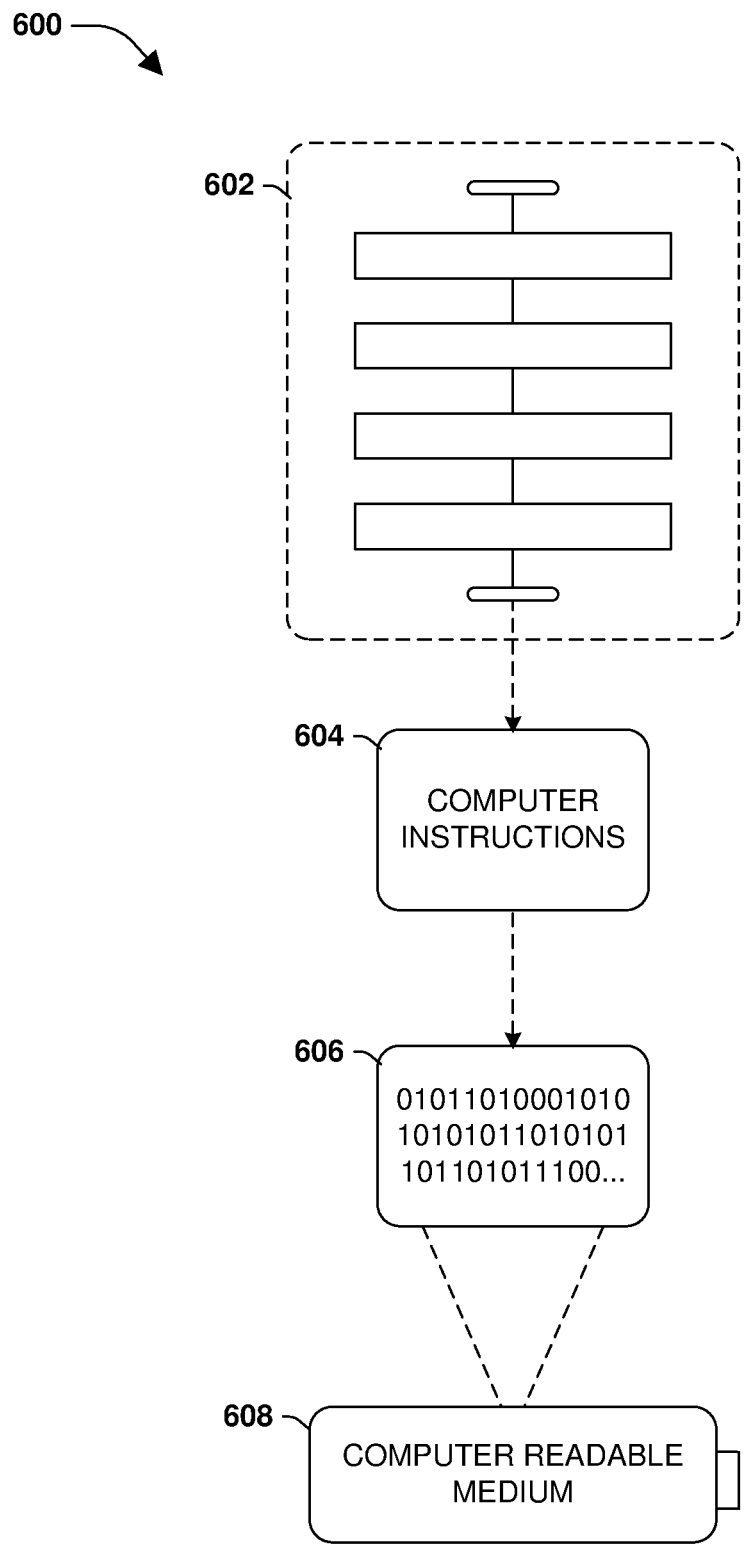
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-ft DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 300 of FIG. 3 and/or at least some of the exemplary method 500 of FIG. 5, for example. In some embodiments, the processor-executable instructions 604 are configured to implement a system, such as at least some of the exemplary system 402 of FIGS. 4A-4I, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
performing a switchover of ownership of a second storage device from a first site to a second site based upon the first site experiencing a failure, wherein the second storage device is maintained at the second site and has a mirroring configuration with a first storage device maintained at the first site, wherein the second site provides data access to the second storage device based upon a mirror vote indicating that the mirroring configuration is up-to-date;
generating a switchover mirror vote based upon the data access, wherein the switchover mirror vote indicates that the second storage device is up-to-date and that the first storage device is out-of-date; and
restoring ownership of the second storage device to the first site based upon a restoration of the first site, wherein the switchover mirror vote is replicated to the first site as a restored mirror vote used to determine which storage device is up-to-date and out-of-date.

2. The method of claim 1, wherein data access is provided to the second storage device by the first site based upon the restored mirror vote indicating that the second storage device is up-to-date.

3. The method of claim 2, wherein the data access excludes access to the first storage device by the first site based upon the restored mirror vote indicating that the first storage device is out-of-date.

4. The method of claim 1, comprising:
comparing the restored mirror vote with an up-to-date mirror vote to determine which storage device up-to-date or out-of-date.

5. The method of claim 4, comprising:
performing a tie-breaker technique to select which storage device the first site will provide data access based upon the restored mirror vote and the up-to-date mirror vote being different.

6. The method of claim 1, comprising:
performing a synchronization between the first storage device and the second storage device using the switchover mirror vote, wherein the synchronization is performed based upon a determination that the first storage is restored.

7. The method of claim 6, comprising:
creating a synchronized mirror vote based upon the synchronization, wherein the synchronized mirror vote is used by the first site to determine which storage device is up-to-date and out-of-date.

8. The method of claim 6, comprising:
creating a heal failure mirror vote based upon identifying a failure of the second storage device during the synchronization.

9. The method of claim 8, wherein the heal failure mirror vote is used by the first site to determine which storage device is up-to-date and out-of-date.

10. A computing device comprising:
a memory having stored thereon instructions for performing a method; and
a processor coupled to the memory, the processor configured to execute the instructions to cause the processor to:
perform a switchover of ownership of a second storage device from a first site to a second site based upon the first site experiencing a failure, wherein the second storage device is maintained at the second site and has a mirroring configuration with a first storage device maintained at the first site, wherein the second site provides data access to the second storage device based upon a mirror vote indicating that the mirroring configuration is up-to-date;
generate a switchover mirror vote based upon the data access, wherein the switchover mirror vote indicates that the second storage device is up-to-date and that the first storage device is out-of-date; and
restore ownership of the second storage device to the first site based upon a restoration of the first site, wherein the switchover mirror vote is replicated to the first site as a restored mirror vote used to determine which storage device is up-to-date and out-of-date.

11. The computing device of claim 10, wherein the instructions cause the processor to:
store the switchover mirror vote within a replication database accessible to the first site and the second site.

12. The computing device of claim 10, wherein the instructions cause the processor to:
store the switchover mirror vote within a root storage location of the second site.

13. The computing device of claim 10, wherein the first site replicates data from the first storage device to the second storage device during normal operation.

14. The computing device of claim 10, comprising:
setting a flag to specify whether a storage aggregate, associated with the first storage device, is online.

15. The computing device of claim 10, comprising:
setting a flag to specify whether a storage aggregate, associated with the first storage device, is offline.

16. The computing device of claim 10, comprising:
setting a flag to specify whether a storage aggregate, associated with the second storage device, is online.

17. A non-transitory computer readable medium having stored thereon instructions which when executed by a machine, causes the machine to:
perform a switchover of ownership of a second storage device from a first site to a second site based upon the first site experiencing a failure, wherein the second storage device is maintained at the second site and has a mirroring configuration with a first storage device maintained at the first site, wherein the second site provides data access to the second storage device based upon a mirror vote indicating that the mirroring configuration is up-to-date;
generate a switchover mirror vote based upon the data access, wherein the switchover mirror vote indicates that the second storage device is up-to-date and that the first storage device is out-of-date; and
restore ownership of the second storage device to the first site based upon a restoration of the first site, wherein the switchover mirror vote is replicated to the first site as a restored mirror vote used to determine which storage device is up-to-date and out-of-date.

18. The non-transitory computer readable medium of claim 17, wherein the instructions cause the machine to:
perform a synchronization between the first storage device and the second storage device using the switchover mirror vote, wherein the synchronization is performed based upon a determination that the first storage is restored.

19. The non-transitory computer readable medium of claim 18, wherein the instructions cause the machine to:
create a synchronized mirror vote based upon the synchronization, wherein the synchronized mirror vote is used by the first site to determine which storage device is up-to-date and out-of-date.

20. The non-transitory computer readable medium of claim 18, wherein the instructions cause the machine to:
create a heal failure mirror vote based upon identifying a failure of the second storage device during the synchronization, wherein the heal failure mirror vote is used by the first site to determine which storage device is up-to-date and out-of-date.

* * * * *